United States Patent
Kato et al.

(10) Patent No.: US 7,569,298 B2
(45) Date of Patent: Aug. 4, 2009

(54) SEPARATOR SEAL STRUCTURE FOR A FUEL CELL

(75) Inventors: Chisato Kato, Aichi-ken (JP); Yoshio Kiyokawa, Nagoya (JP); Shiro Akiyama, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/161,617

(22) Filed: Jun. 5, 2002

(65) Prior Publication Data

US 2002/0187384 A1 Dec. 12, 2002

(30) Foreign Application Priority Data

Jun. 8, 2001 (JP) ............... 2001-173651

(51) Int. Cl.
*H01M 2/08* (2006.01)
*F16J 15/02* (2006.01)
(52) U.S. Cl. .................... 429/35; 277/628
(58) Field of Classification Search .............. 429/34–39
See application file for complete search history.

(56) References Cited

U.S. PATENT DOCUMENTS

| | | | |
|---|---|---|---|
| 5,284,718 A | 2/1994 | Chow et al. | 429/26 |
| 6,044,842 A | 4/2000 | Pereira et al. | 128/202.27 |
| 6,057,054 A | 5/2000 | Barton et al. | |
| 6,080,503 A * | 6/2000 | Schmid et al. | 429/35 |
| 6,451,468 B1 | 9/2002 | Adachi | |
| 6,596,427 B1 * | 7/2003 | Wozniczka et al. | 429/32 |
| 6,610,435 B1 * | 8/2003 | Maruyama et al. | 429/34 |
| 6,641,862 B1 * | 11/2003 | Grot | 427/115 |
| 6,720,103 B1 * | 4/2004 | Nagai | 429/36 |

(Continued)

FOREIGN PATENT DOCUMENTS

DE 197 13 250 A1 10/1998

(Continued)

OTHER PUBLICATIONS

IPDL JPO Machine Translation for JP 08-045517 A (publication date of Feb. 1996).*

(Continued)

*Primary Examiner*—Patrick Ryan
*Assistant Examiner*—Keith Walker
(74) *Attorney, Agent, or Firm*—Kenyon & Kenyon LLP (57) ABSTRACT

A seal structure of a fuel cell includes a first seal surface formed in a first separator disposed on one side of an electrolyte membrane and a second seal surface formed in a second separator disposed on the other side of the electrolyte membrane, and a sealant collecting structure formed in or outside at least one of the first and second seal surfaces. The sealant collecting structure is constructed of a stepped receding surface formed in at least one of the first and second seal surfaces, a concave or groove formed in an inner portion and/or an outer portion of at least one of the first and second seal surfaces, a space formed outside at least one of the separators, or a stepped recess formed in at least one of the separators. The sealant collecting structure receives an extra sealant therein to ensure uniform seal pressure acting on the sealant and to prevent the extra sealant from being bulged out to gas passages and to a gas manifold.

3 Claims, 5 Drawing Sheets

U.S. PATENT DOCUMENTS

| | | |
|---|---|---|
| 2002/0150810 A1 | 10/2002 | Mizuno |
| 2003/0031914 A1* | 2/2003 | Frank et al. .................... 429/35 |

FOREIGN PATENT DOCUMENTS

| | | |
|---|---|---|
| DE | 100 48 331 A1 | 9/1999 |
| DE | 199 60 516 A1 | 7/2000 |
| JP | 56-070255 A | 6/1981 |
| JP | 62-193065 A | 8/1987 |
| JP | 62-221435 A | 9/1987 |
| JP | 63-211570 A | 9/1988 |
| JP | 02-215052 A | 8/1990 |
| JP | 02-278664 A | 11/1990 |
| JP | 03-067466 A | 3/1991 |
| JP | 04-071167 A | 3/1992 |
| JP | 04-280078 A | 10/1992 |
| JP | 06-076840 A | 3/1994 |
| JP | 06-119930 A | 4/1994 |
| JP | 7-249417 | 9/1995 |
| JP | 08-007902 A | 1/1996 |
| JP | H) 08-045517 | 2/1996 |
| JP | 08-185875 A | 7/1996 |
| JP | 08-190921 A | 7/1996 |
| JP | 09-147890 A | 6/1997 |
| JP | 09-167623 A | 6/1997 |
| JP | 09-199145 A | 7/1997 |
| JP | (H) 11-154522 | 6/1999 |
| JP | 2001 102 072 A | 9/1999 |
| JP | 2000-048835 A | 2/2000 |
| JP | WO01/17048 * | 3/2001 |
| JP | 2001-283893 A | 10/2001 |
| JP | 2001-319676 A | 11/2001 |
| WO | WO99/53559 | 10/1999 |

OTHER PUBLICATIONS

Japanese Language version of Official Communication, JPA No. 2001-173651, issued Dec. 13, 2005.
Japanese Language Version of Japanese Office Action, Appln. No. 2001-173851 mailed Apr. 17, 2007.
English Translation of Japanese Office Action, Appln. No. 2001-173651 mailed Apr. 17, 2007.

* cited by examiner

(COMPARISON)

FIG. 9
(COMPARISON)

FIG. 10
(COMPARISON)

SEPARATOR SEAL STRUCTURE FOR A FUEL CELL

BACKGROUND OF THE INVENTION

1. Field of the Invention

The present invention relates to a seal structure of a fuel cell of a polymer electrolyte-type.

2. Description of Related Art

A PEFC (Polymer Electrolyte Fuel Cell) apparatus includes individual fuel cells. Each fuel cell includes a membrane-electrode assembly (MEA) and a separator. The MEA includes an electrolyte membrane and a pair of electrodes disposed on opposite sides of the electrolyte membrane. The pair of electrodes includes an anode provided on one side of the membrane and constructed of a first catalyst layer and a cathode provided on the other side of the membrane and constructed of a second catalyst layer. A first diffusion layer may be provided between the first catalyst layer and a first separator and a second diffusion layer may be provided between the second catalyst layer and a second separator. The first separator has a passage formed therein for supplying fuel gas (hydrogen) to the anode and the second separator has a passage formed therein for oxidant gas (oxygen, usually, air) to the cathode. At least one layer of the fuel cell 1 constructs a module. A number of modules are piled, and electrical terminals, electrical insulators, and end plates are disposed at opposite ends of the pile of modules to construct a stack of fuel cells. After tightening the stack of fuel cells between the opposite end plates in a fuel cell stacking direction, the end plates are coupled to a fastening member (for example, a tension plate) extending in a fuel cell stacking direction outside the pile of fuel cells by bolts extending perpendicularly to the fuel cell stacking direction.

In the PEFC, at the anode, hydrogen is changed to positively charged hydrogen ions (i.e., protons) and electrons. The hydrogen ions move through the electrolyte membrane to the cathode where the hydrogen ions react with oxygen supplied and electrons (which are generated at an anode of the adjacent MEA and move to the cathode of the instant MEA through a separator) to form water as follows:

At the anode: $H_2 \rightarrow 2H^+ + 2e^-$

At the cathode: $2H^+ + 2e^- + (\frac{1}{2})O_2 \rightarrow H_2O$

In order that the above reaction is conducted, fuel gas and oxidant gas are supplied to the stack. Further, since the fuel cell temperature rises due to the heat generated at the water production reaction and a Joulean heat, a coolant passage is formed at every cell or at every module, and a coolant (usually, cooling water) is caused to flow in the coolant passage. In order to prevent the fuel gas, the oxidant gas, and the coolant from leaking from respective passages, every fuel cell is sealed between the separators thereof.

Japanese Patent Publication No. HEI 11-154522 discloses use of fluid sealant (liquid gasket) to seal between the separators.

However, with the conventional seal structure of a fuel cell, there are the following problems:

First, it is difficult to assure a uniform seal. Since a thickness of the sealant differs by a thickness of the electrolyte membrane between at a region where an electrolyte membrane exists and at another region where the electrolyte membrane does not exist, a seal pressure imposed on the sealant changes and a uniform seal pressure is not assured. More particularly, at the region where the electrolyte membrane exists a large pressure acts on the sealant and the creep of the sealant is large so that the seal pressure decreases with the lapse of time, which is accompanied by loosening of the tightening force of the stack and thereby decreasing the output the fuel cell.

Second, not only is there the above seal pressure variance due to whether the electrolyte membrane exists or not between the seal surfaces, but there also is a variance in the coated thickness of the sealant which makes it difficult to obtain a uniform seal pressure. At a place where an overpressure acts on the sealant, the sealant may be bulged out from between the seal surfaces. If the bulged sealant decreases a cross-sectional area of a gas passage or blocks the gas passage, the output of the fuel cell will be badly affected.

SUMMARY OF THE INVENTION

An object of the present invention is to provide a seal structure of a fuel cell capable of assuring a uniform seal pressure.

Another object of the present invention is to provide a seal structure of a fuel cell capable of preventing a sealant from being bulged out from between seal surfaces as well as assuring a uniform seal pressure.

BRIEF DESCRIPTION OF THE DRAWINGS

The above and other objects, features, and advantages of the present invention will become apparent and will be more readily appreciated from the following detailed description of the preferred embodiments of the present invention in conjunction with the accompanying drawing, in which.

DETAILED DESCRIPTION OF THE PREFERRED EMBODIMENTS

A seal structure of a fuel cell according to the present invention will be explained with reference to FIGS. 1-16.

Figure 1:
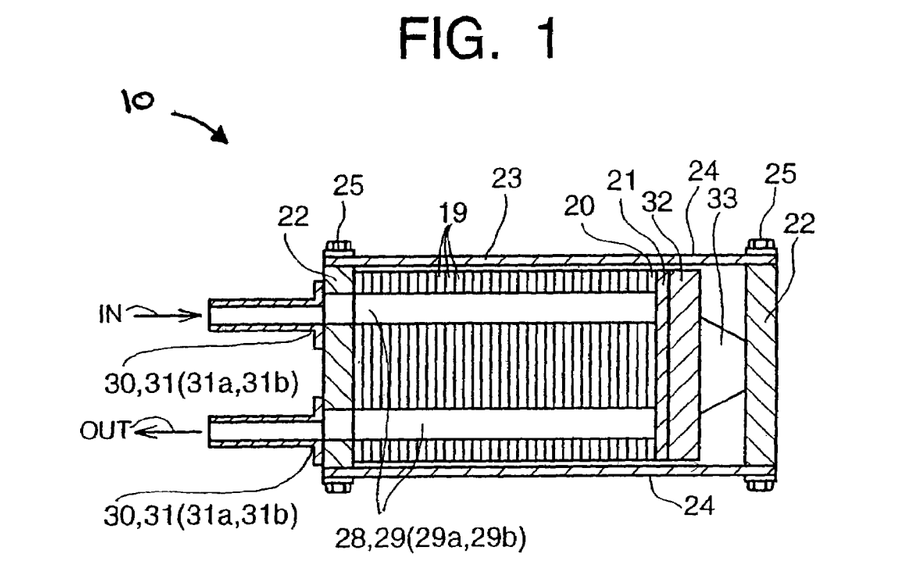
FIG. 1 is an elevational view of a stack of fuel cells to which a seal structure of a fuel cell according to the present invention is applied.
Figure 2:
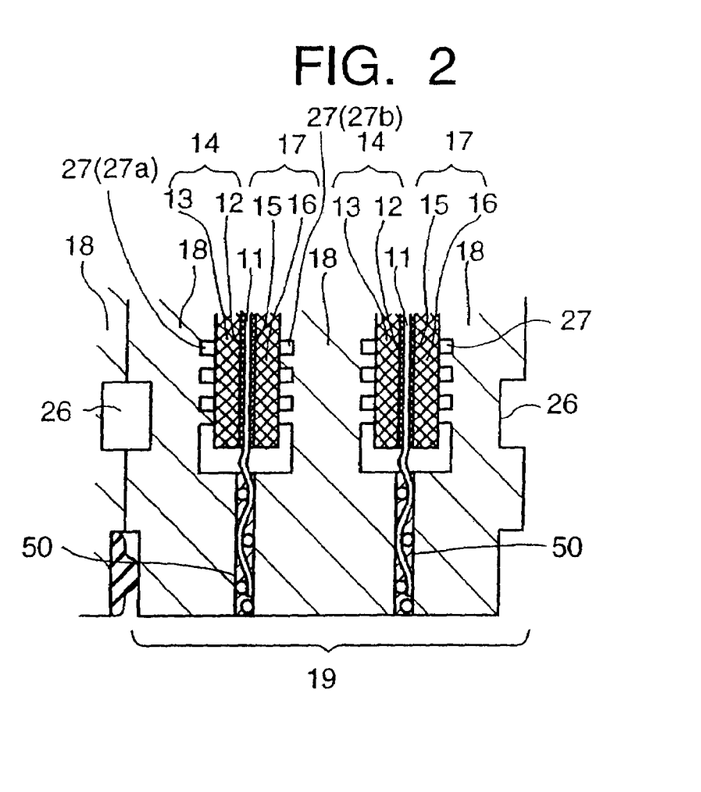
FIG. 2 is a cross-sectional view of a portion of the stack of fuel cells of FIG. 1.

FIGS. 1 and 2 illustrate a stack of fuel cells applicable to any embodiment of the present invention. FIGS. 3, 5, 6, 7, 8, and 11 illustrate a first embodiment, a second embodiment, a third embodiment, a fourth embodiment, a fifth embodiment, and a sixth embodiment of the present invention, respectively.

Portions common or similar to all of the embodiments of the present invention are denoted with the same reference numerals throughout all of the embodiments of the present invention.

First, those portions common or similar to all of the embodiments of the present invention will be explained with reference to FIGS. 1-3.

A fuel cell 10 to which a seal structure of a fuel cell according to the present invention is of a polymer electrolyte fuel cell (hereinafter, PEFC)-type. The fuel cell 10 is mounted to, for example, a vehicle. However, the fuel cell 10 may be used for other than a vehicle.

Figure 3:
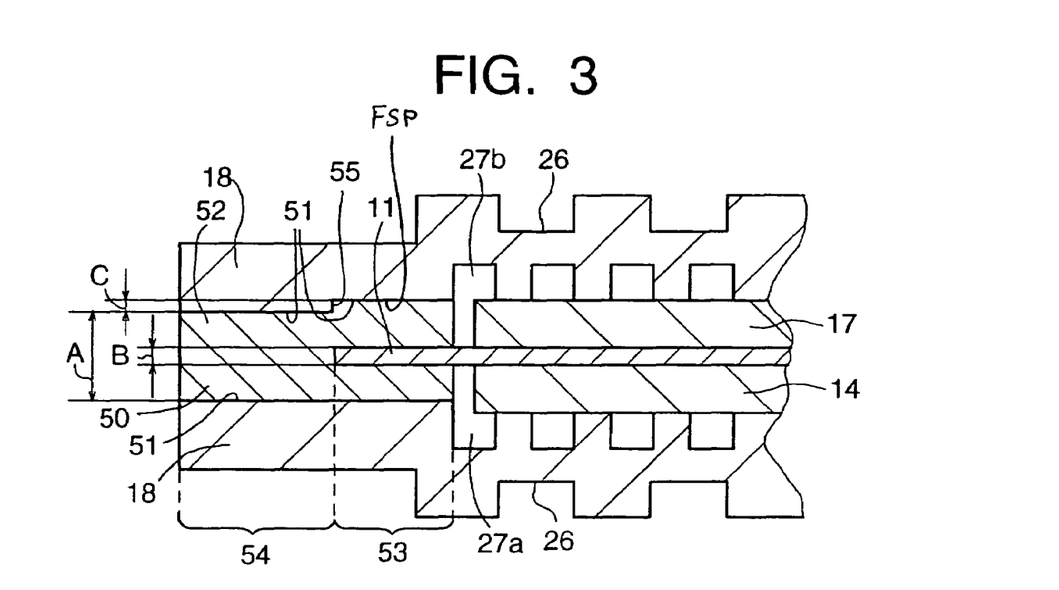
FIG. 3 is a cross-sectional view of a seal structure of a fuel cell according to a first embodiment of the present invention.

As illustrated in FIGS. 1-3, the PEFC 10 includes a stack of individual fuel cells 23. Each fuel cell includes a membrane-electrode assembly (MEA) and a separator 18. The MEA includes an electrolyte membrane 11 and a pair of electrodes disposed on opposite sides of the membrane 11. The pair of electrodes include (a) an anode 14 provided on one side of the membrane and including a first catalyst layer 12 and (b) a cathode 17 provided on the other side of the membrane and including a second catalyst layer 15. A first diffusion layer 13 may be disposed between the first catalyst layer 12 and a separator 18 provided on an anode side of the MEA, and a second diffusion layer 16 may be disposed between the second catalyst layer 15 and a separator 18 provided on a cathode side of the MEA. The separator 18 provided on an anode side of the MEA includes a fuel gas (hydrogen) passage 27a formed at a first, MEA-opposing surface and a coolant (cooling water) passage 26 formed at a second, opposite surface. The separator 18 provided on a cathode side of the MEA includes an oxidant gas (oxygen, usually, air) passage 27b formed at a first, MEA-opposing surface and may include a coolant (cooling water) passage 26 or a second gas passage 27 formed at a second, opposite surface. At least one fuel cell constructs a module 19, and a number of modules are piled, and electrical terminals 20, electrical insulators 21, and end plates 22 are disposed at opposite ends of the pile of modules to construct the stack of fuel cells 23. After tightening the stack of fuel cells 23 between the end plates 22 in a fuel cell stacking direction, the end plates 22 are coupled to the fastening member 24 (for example, a tension plate) extending in the fuel stacking direction outside the pile of fuel cells by bolts 25 or nuts.

The coolant passage 26 is provided at every fuel cell or at every module.

As illustrated in FIG. 1, in the stack of fuel cells 23, a coolant manifold 28 is formed. The coolant manifold 28 communicates with the coolant passage 26 of the fuel cell. The coolant flows from an inlet side coolant manifold 28 to the coolant passage 26 of the fuel cell and then from the coolant passage 26 of the fuel cell to an outlet side coolant manifold 28.

Similarly, in the stack of fuel cells 23, a gas manifold 29 is formed. The gas manifold 29 includes a fuel gas manifold 29a and an oxidant gas manifold 29b. The fuel gas manifold 29a communicates with the fuel gas passage 27a of the fuel cell, and the oxidant gas manifold 29b communicates with the oxidant gas passage 27b of the fuel cell. The fuel gas flows from an inlet side fuel gas manifold 29a to the fuel gas passage 27a of the fuel cell and then from the fuel gas passage 27a of the fuel cell to an outlet side fuel gas manifold 29a. The oxidant gas flows from an inlet side oxidant gas manifold 29b to the oxidant gas passage 27b of the fuel cell and then from the oxidant gas passage 27b of the fuel cell to an outlet side oxidant gas manifold 29b.

As illustrated in FIG. 1, at a first end portion of the fuel cell stack 23, a pressure plate 32 and a spring mechanism 33 are disposed to suppress a variance of a load imposed on the fuel cell stack 23, and at a second, opposite end of the fuel cell stack 23, such a pressure plate and a spring mechanism are not disposed. A coolant piping 30 for supplying coolant to and exhausting the coolant from the fuel cell stack 23 is connected to the end plate 22 located at the second end of the fuel cell stack 23, and a gas piping 31 for supplying reactant gas to and exhausting the reactant gas from the fuel cell stack 23 is connected to the end plate 22 located at the second end of the fuel cell stack 23. The gas piping 31 includes a fuel gas piping 31a and an oxidant gas piping 31b. The fuel gas piping 31a communicates with the fuel gas manifold 29a and the oxidant gas piping 31b communicates with the oxidant gas manifold 29b. The coolant, the fuel gas, and the oxidant gas enter the fuel cell stack 23 at the end plate 22 located at the second end of the fuel cell stack 23, U-turn in the fuel cell stack 23, and return to the end plate 22 located at the same, second end of the fuel cell stack 23.

The separator 18 is constructed of any one of (a) a plate made from carbon and including the coolant passage 26 and/or the gas passage 27 (the fuel gas passage 27a, the oxidant gas passage 27b) formed therein, (b) a plate made from synthetic resin which is made electrically conductive by being mixed with electrical particles, and including the coolant passage 26 and/or the gas passage 27 formed therein, and (c) an assembly of a plurality of metal plates having a concave and/or a convex for forming passages 26, 27. The separator 18 shown in the drawing is the carbon separator.

The separator 18 separates (a) fuel gas and oxidant gas from each other, (b) fuel gas and coolant from each other, and/or (c) oxidant gas and coolant from each other. The separator 18 is made from conductive material and constitutes an electrical current passage through which electrons move from the anode of one fuel cell to the cathode of an adjacent fuel cell.

As illustrated in FIG. 3, an outer periphery of the electrolyte membrane 11 is sandwiched via a sealant 50 between a first separator 18 and a second separator 18 located on opposite sides of the electrolyte membrane 11 so that the fuel cell is sealed by the sealant 50, between the first and second separators and between the electrolyte membrane 11 and each of the first and second separators 18. The sealant 50 is constructed of a fluid sealant (liquid gasket) coated on a first seal surface 51 formed in the first separator 18 and a second seal surface 51 formed in the second separator 18. The fluid sealant is dried and solidified to be elastic and constructs a seal portion 52 between the first and second seal surfaces 51. The peripheral portion of the electrolyte membrane 11 is located at an inner portion of the seal portion 52 where the sealant 50 seals between the electrolyte membrane 11 and each of the first seal surface 51 of the first separator 18 and the second seal surface 51 of the second separator 18. The peripheral portion of the electrolyte membrane 11 is not located at an outer portion of the seal portion 52 where the sealant 50 seals between the first seal surface 51 of the first separator 18 and the second seal surface 51 of the second separator 18. The electrodes 14 and 17 are located inside the seal portion 52 and do not contact the seal portion 52. The sealant 50 insulates the first and second separators 18 sandwiching the sealant 50 from each other and is made from an electrical insulator, for example, an adhesive made from synthetic resin. The seal portion 52 extends continuously over an entire length of a periphery of the fuel cell. In a case where a shape of the fuel cell is rectangular, the seal portion 52 extends continuously throughout the four sides of the rectangular fuel cell.

A seal structure of the fuel cell includes the first seal surface 51 formed in the first separator 18 and the second seal surface 51 formed in the second separator 18, and a sealant collecting structure for collecting a portion of the sealant 50 therein.

The first and second seal surfaces 51 oppose each other in a fuel cell stacking direction. The sealant collecting structure is formed in at least one of the first and second seal surfaces 51 or outside a side surface of at least one of the first and second separators 18. The sealant collecting structure includes a stepped receding surface formed in at least one of the first and second seal surfaces 51, a concave or groove formed in at least one the first and second seal surfaces 51, a chamfer or a stepped recess formed at the outer end portion of at lease one of the first and second separators 18, or a space formed outside a side surface of one of the first and second separators 18.

Due to provision of the sealant collecting structure, even if a coating amount of the sealant 50 on the first and second seal surfaces 51 is non-uniform, an extra sealant escapes into the sealant collecting structure. As a result, a seal pressure becomes uniform over the entire area of the first and second seal surfaces and an output of the fuel cell becomes stable. Further, the sealant 50 is unlikely to be bulged out into the gas manifolds and the gas passages so that reduction of a cross-sectional areas of the manifolds and the passages does not occur, which makes the output of the fuel cell further stable.

Next, portions unique to each of the present invention will be explained.

First Embodiment

With the first embodiment of the present invention, as illustrated in FIG. 3, a first distance (A+C) between the first and second seal surfaces 51 at a first region 53 where the electrolyte membrane 11 exists between the first and second seal surfaces 51 and a second distance (A) between the first and second seal surfaces 51 at a second region 54 where the electrolyte membrane 11 does not exist between the first and second seal surfaces 51 differ from each other so that a first surface portion FSP located at the first region 53 of at least one of the first and second seal surfaces 51 recedes from a remaining, second surface portion located at the second region 54 of the at least one of the first and second seal surfaces 51. The sealant collecting structure is constructed of the first surface portion.

The first distance (A+C) is greater than the second distance (A) by a thickness (B) of the electrolyte membrane 11, where (C) is equal to (B). As a result, a thickness (A) of the sealant at the first region 53 is equal to a thickness (A) of the sealant at the second region 54.

The increment (C) of the distance between the first and second seal surfaces 51 at the first region 53 is obtained by forming a stepped surface 55 having a depth equal to the increment (C) in one of the first and second seal surfaces 51, or by forming a stepped surface having a depth equal to a portion (for example, ½(C)) of the increment (C) in one of the first and second seal surfaces 51 and a stepped surface having a depth equal to a remaining portion (for example, ½(C)) of the increment (C) in the other of the first and second seal surfaces 51.

Figure 4:
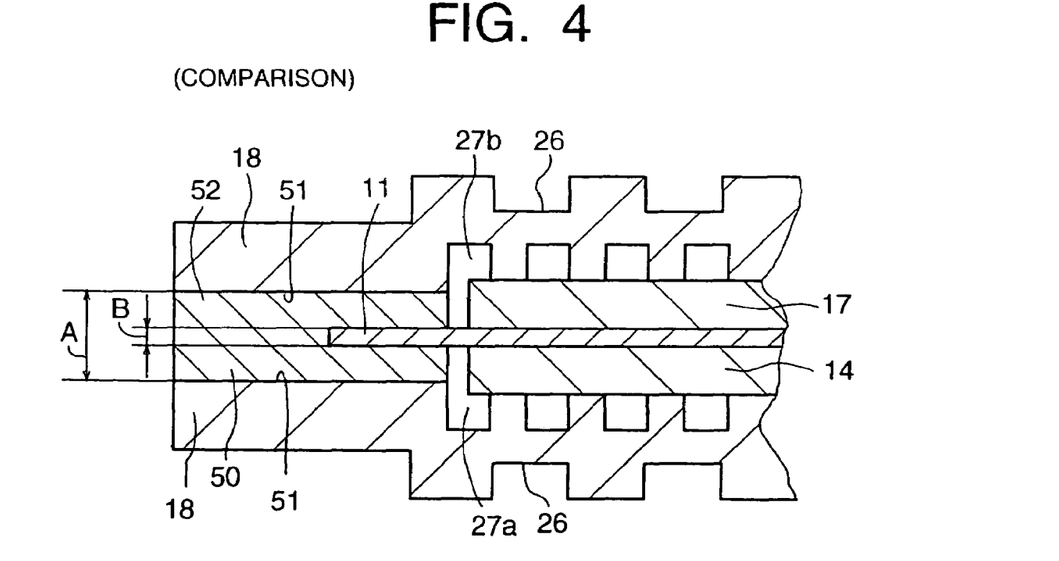
FIG. 4 is a cross-sectional view of a seal structure of a fuel cell of a comparison for the structure of FIG. 3.

In a comparison (not included in the present invention) of FIG. 4, a seal surface does not have a stepped receding surface. A distance (A) between the seal surfaces at a region 53 where the electrolyte membrane 11 is sandwiched between the seal surfaces is equal to a distance (A) between the seal surfaces at a region 54 where the electrolyte membrane 11 is not sandwiched between the seal surfaces. A thickness (A−B, where B is a thickness of the electrolyte membrane) of the sealant 50 at the region 53 where the electrolyte membrane 11 is sandwiched between the seal surfaces is smaller than a thickness (A) of the sealant 50 at the region 54 where the electrolyte membrane 11 is not sandwiched between the seal surfaces, by the thickness (B) of the electrolyte membrane 11. Therefore, when the stacking load is imposed, the sealant 50 at the region 53 where the electrolyte membrane 11 is sandwiched between the seal surfaces is excessively pressed, and the sealant at the region 53 causes a large amount of creep in a relatively short period of time. As a result, a pressure necessary to the electrodes will be lost in a relatively short period of time and the output of the fuel cell decreases.

With technical advantages of the first embodiment of the present invention, since the first distance between the first and second seal surfaces 51 at the first region 53 where the electrolyte membrane 11 is sandwiched between the first and second seal surfaces 51 is made different from the second distance between the first and second seal surfaces 51 at the second region where the electrolyte membrane 11 is not sandwiched between the first and second seal surfaces 51, especially since the first distance is greater than the second distance by the thickness of the electrolyte membrane 11, a seal pressure acting on the sealant 50 is uniform over the first region 53 and the second region 54, and the seal characteristic becomes stable.

Due to the seal structure, the problem caused in the comparison that the seal pressure is locally increased at the first region 53 accompanied by a fast creep is prevented, so that the output of the fuel cell is stable for a long period of time.

Further, since the stepped receding surface formed in at least one of the first and second seal surfaces 51 acts as a sealant collecting structure, the stepped receding surface receives therein an extra sealant to prevent the extra sealant from being bulged into the gas passages and the coolant passages, so that reduction of the cross-sectional area of those passages due to a bulged sealant is prevented. Also, the sealant is prevented from being bulged to the electrodes and the troubles therefrom.

Second Embodiment

Figure 5:
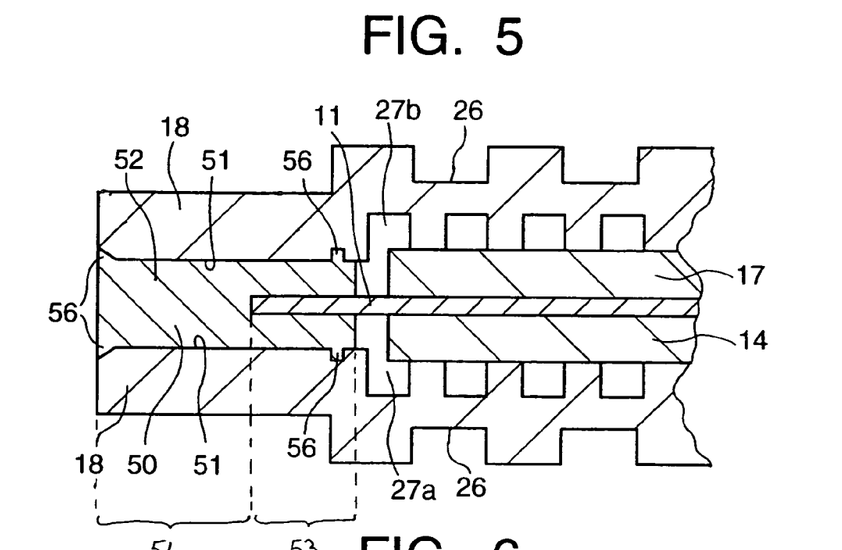
FIG. 5 is a cross-sectional view of a seal structure of a fuel cell according to a second embodiment of the present invention.

With the second embodiment of the present invention, as illustrated in FIG. 5, a concave 56 is formed in at least one of the first and second seal surfaces 51 of the first and second separators 18 opposing each other via the electrolyte membrane 11. The sealant collecting structure is constructed of the concave 56 in the second embodiment of the present invention. The concave 56 can be a groove, a recess, or chamfer. A cross-section of the concave 56 can be rectangular, triangular, polygonal, semi-circle, R-shaped, or of a chamfer.

The at least one of the first and second seal surfaces 51 has a width and includes an inner portion 53 (a portion closer to the electrode) and an outer portion (a portion further from the electrode) 54 in the width, and the concave 56 may be formed (a) in the inner portion of the seal surface 51 of the separator 18, (b) in an outer portion of the seal surface 51 of the separator 18, or (c) both in the inner portion and the outer portion of the seal surface 51 of the separator 18. FIG. 5 illustrates the above (c) case.

The at least one of the first and second seal surfaces 51 includes at least one kind of manifold 28, 29a, and 29b, and the concave 56 may be formed not only in the inner and/or outer portion of the seal surface 51 of the separator 18 but also along the at least one kind of manifold 28, 29a, and 29b.

With technical advantages of the second embodiment of the present invention, since the sealant collecting structure includes the concave 56 and the concave 56 is formed in the seal surface 51, at a region where a relatively large pressure acts on the sealant 50 (for example, at the region 53 where the electrolyte membrane 11 exists between the first and second seal surfaces 51, and at a region where a too large amount of sealant 50 is coated), an extra sealant escapes into the concave 56, so that a seal pressure becomes uniform. As a result, the same advantages as those of the first embodiment of the present invention are obtained.

Further, since the extra sealant escapes into the concave 56, the sealant is prevented from being bulged into the reactant gas passages and the coolant passage and a blockage of the passages by a bulged sealant is prevented or suppressed.

Further, in assembly of the fuel cell and the stack of fuel cells 23, work for removing a bulged sealant is unnecessary. When a size of the fuel cell is determined, a lose of an active area of the electrodes due to a bulged sealant has been taken into account in the conventional design of the fuel cell, and the decrease in the active area of the electrodes is accompanied by an increase in the size of the fuel cell. However, since such a loss of an active area of the electrodes due to a bulged sealant is unnecessary to be taken into account in the design of the fuel cell in the present invention, an increase in the size of the module and the stack of the fuel cell is not caused.

Especially, in the case where the concave 56 is formed in the inner portion of the seal surface 51, the sealant is prevented from being bulged into the electrodes and the gas passages 27a and 27b and troubles due to such bulging of the sealant is suppressed.

In the case where the concave 56 is formed in the outer portion of the seal surface 51, the sealant 50 is prevented from being bulged to a side surface of the module and from being bulged around to a back surface of the module. As a result, the modules can be layered in parallel with each other without being obstructed by a bulged sealant unlike a comparison of FIG. 10.

Third Embodiment

Figure 6:
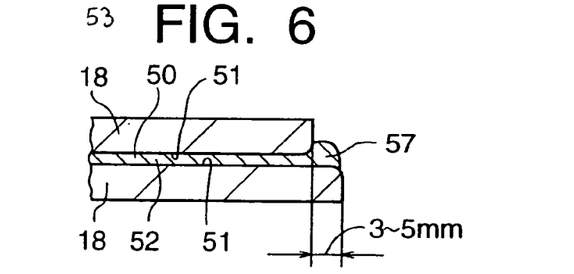
FIG. 6 is a cross-sectional view of a seal structure of a fuel cell according to a third embodiment of the present invention.

With the third embodiment of the present invention, as illustrated in FIG. 6, the first and second separators 18 have sizes different from each other in the direction perpendicular to the fuel cell stacking direction, and the sealant collecting structure includes a space 57 formed outside a side surface of a smaller-sized separator. More particularly, a larger-sized separator extends further than the smaller-sized separator by 3-5 mm, and the space 57 is formed above an upper surface of the larger-sized separator and outside the side surface of the smaller-sized separator.

Figure 9:
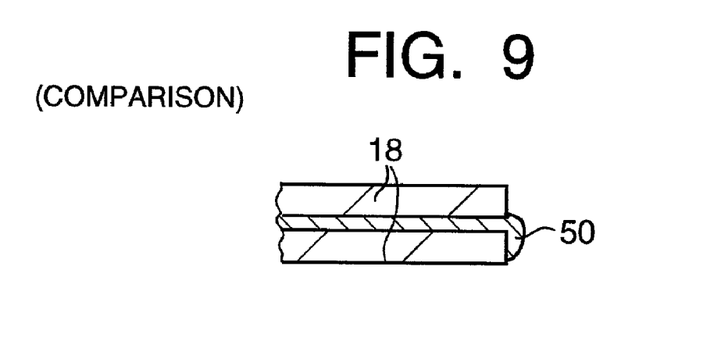
FIG. 9 is a cross-sectional view of a seal structure of a fuel cell of a comparison for the structures of FIG. 6-8.
Figure 10:
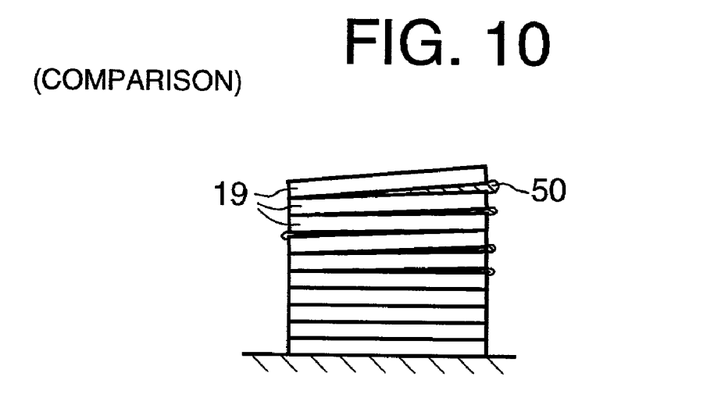
FIG. 10 is a side elevational view of a stack of fuel cells of another comparison for the structures of FIG. 6-8.

FIGS. 9 and 10 illustrate comparisons which are not included in the present invention. If the opposing separators have the same sizes, when the sealant is bulged out to a side surface of the module, the bulged sealant drops and adheres to the side surface of the module. It is necessary to remove the sealant from the side surface of the module by a cutter knife or other devices. If the sealant is bulged around to the back surface of the separator, it is difficult to pile the fuel cells in parallel with each other.

With technical advantages of the third embodiment of the present invention, even if the sealant 50 is bulged out from between the seal surfaces 51, the bulged sealant is collected in the space 57 and is not bulged to a side of the module or around to a back surface of the separator. As a result, work to remove a bulged sealant will be unnecessary.

Fourth Embodiment

Figure 7:
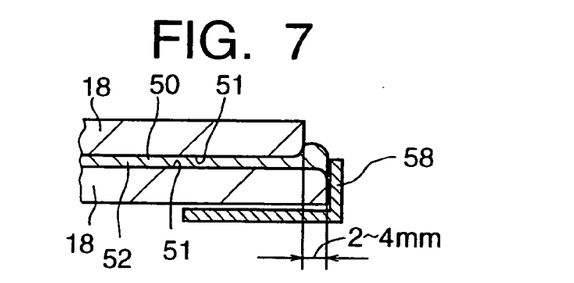
FIG. 7 is a cross-sectional view of a seal structure of a fuel cell according to a fourth embodiment of the present invention.

With the fourth embodiment of the present invention, as illustrated in FIG. 7, a dam 58 is provided. The first and second separators 18 have sizes different from each other in the direction perpendicular to the fuel cell stacking direction, and the sealant collecting structure includes a space 57 between the dam 58 and a side surface of a smaller-sized separator. More particularly, a larger-sized separator extends further than the smaller-sized separator by 2-4 mm, and the space 57 is formed above an upper surface of the larger-sized separator and between the dam 58 and the side surface of the smaller-sized separator.

With technical advantages of the fourth embodiment of the present invention, even if the sealant 50 is bulged out from between the seal surfaces 51, the bulged sealant is collected in the space 57 and is not bulged to a side of the module or around to a back surface of the separator. As a result, work to remove a bulged sealant will be unnecessary. Further, since the dam 58 is provided, the protrusion amount of the larger-sized separator from the smaller-sized separator can be smaller than that of the third embodiment of the present invention.

FIFTH Embodiment

Figure 8:
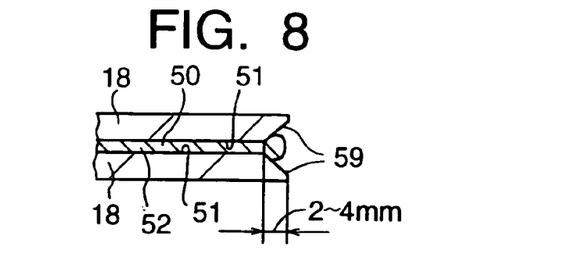
FIG. 8 is a cross-sectional view of a seal structure of a fuel cell according to a fifth embodiment of the present invention.

With the fifth embodiment of the present invention, as illustrated in FIG. 8, at least one of the first and second separators 18 includes a chamfer 59 formed at a corner of an outer end of the at least one of the first and second separators 18. The sealant collecting structure includes the chamfer 59. A size of a side of the chamber 59 is 2-4 mm. The chamfer 59 may be replaced by an R-shape (curved surface).

With technical advantages of the fifth embodiment of the present invention, even if the sealant 50 is bulged out from between the seal surfaces 51, the bulged sealant is collected in the space defined by the chamber 59 and is not bulged to a side of the module or around to a back surface of the separator. As a result, work to remove a bulged sealant will be unnecessary. Further, by forming the concave 56 in the form of a chamfer (FIG. 8) or in the form of an R-shape at an outer end of the separator, the opposing first and second separators 18 do not contact with each other even if the outer ends of the separators are slightly bent in manufacture, whereby an electrically short circuit is prevented.

Sixth Embodiment

Figure 11:
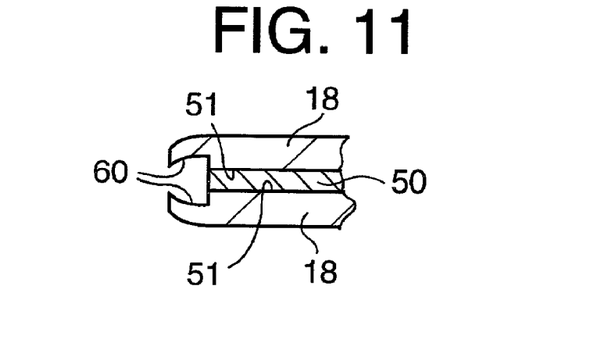
FIG. 11 is a cross-sectional view of a seal structure of a fuel cell according to a sixth embodiment of the present invention.
Figure 12:
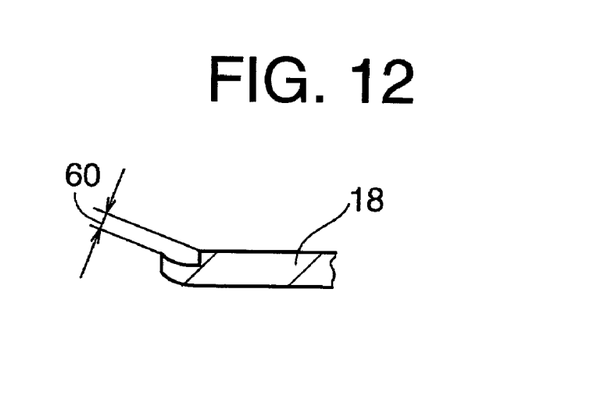
FIG. 12 is a side view of an outer end portion of a separator of the seal structure of a fuel cell according to the sixth embodiment of the present invention.
Figure 13:
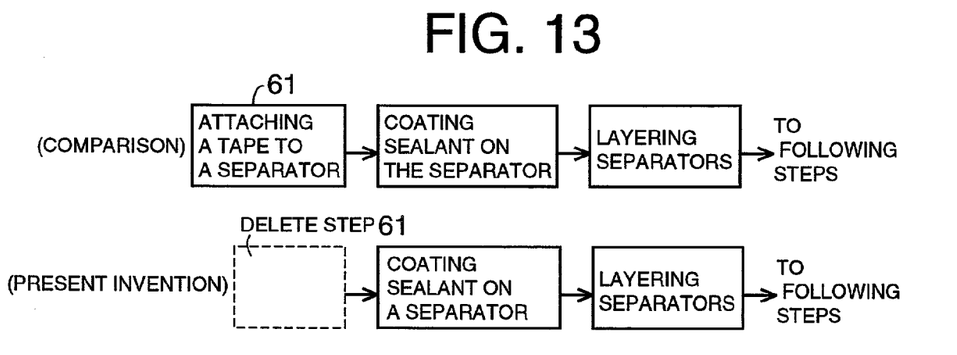
FIG. 13 is a block diagram illustrating assembly of the seal structure of a fuel cell according to the sixth embodiment of the present invention and a comparison for the sixth embodiment of the present invention.

With the sixth embodiment of the present invention, as illustrated in FIGS. 11-13, at least one of the first and second separators 18 includes a stepped recess 60 extending between the seal surface 51 and an outside surface of the at least one of the first and second separators 18, and the sealant collecting structure includes the recess 60.

The recess 60 recedes from the opposing separator in the fuel cell stacking direction. A depth of the recess 60 is determined such that even if the outer end portion of the separator 18 is bent toward the opposing separator as shown in FIG. 12, the outer end portions of the opposing separators do not contact with each other as shown in FIG. 11.

Figure 14:
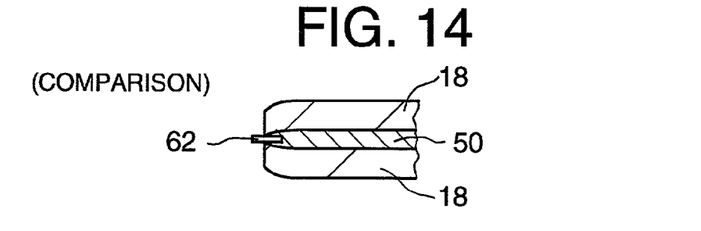
FIG. 14 is a cross-sectional view of a seal structure of a fuel cell of a comparison for the structure of the sixth embodiment of the present invention.
Figure 15:
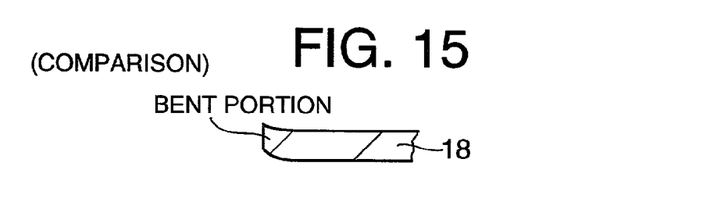
FIG. 15 is a side view of an outer end portion of a separator of the comparison of FIG. 14.
Figure 16:
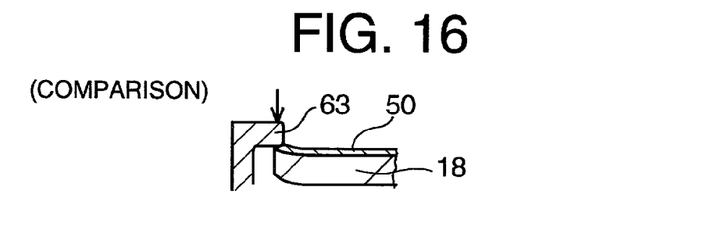
FIG. 16 is a side view of the separator of FIG. 15 in a case where the outer end portion of the separator is pressed so as not to be bent excessively.

In a comparison of FIGS. 14-16, in order to prevent the outer end portions of the opposing separators from being bent as shown in FIG. 15 and being brought into contact with each other and causing an electrically short circuit, an electrical insulator 62 has to be disposed between the outer end portions of the opposing separators as shown in FIG. 14. To insert the insulator 62 between the separators, as illustrated in an upper half of FIG. 13, a step 61 to attach an insulation tape to the outer end of the separator has been necessary before a step to coat the insulator on the separator in the conventional assembly of the fuel cell. In contrast, in the present invention, as illustrated in a lower half of FIG. 13, the step 61 is unnecessary. Further, in the conventional assembly of the fuel cell, a pushing jig 63 for pushing the outer end of the separator has been necessary to prevent the outer end of the separator from being bent. In contrast, in the present invention, such pushing jig does not need to be provided.

With technical advantages of the sixth embodiment of the present invention, since the recess 60 is formed in the outer end portion of the separator 18, the outer end portions of the opposing separators are not brought into contact with each other, so that a short circuit is not formed between the outer end portions of the opposing separators.

Further, even if the sealant 50 is bulged out from between the seal surfaces 51, the bulged sealant is collected in the space defined by the recess 60 and is not bulged to a side of the module or around to a back surface of the separator. As a result, it is possible to layer the fuel cells in parallel with each other. Furthermore, work to remove a bulged sealant will be unnecessary during assembly of the fuel cell and the stack of fuel cells 23.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A seal structure of a fuel cell where an outer periphery of an electrolyte membrane is encased by a sealant and held between a first separator and a second separator located on opposite sides of the electrolyte membrane so that said fuel cell is sealed between said first and second separators and between said electrolyte membrane and each of said first and second separators, said seal structure comprising:
   a first seal surface formed in said first separator, and a second seal surface formed in said second separator, said first seal surface and said second seal surface opposing each other; and
   first and second stepped recesses formed respectively in outer end portions of said first and second separators, said first stepped recess extending between said first seal surface and an outside surface of said first separator, said second stepped recess extending between said second seal surface and an outside surface of said second separator, wherein a distance between a surface of the first stepped recess and a surface of the second stepped recess is greater than a distance between the first and second seal surfaces.

2. A seal structure of a fuel cell where an outer periphery of an electrolyte membrane is encased by a sealant and held between a first separator and a second separator located on opposite sides of the electrolyte membrane so that said fuel cell is sealed between said first and second separators and between said electrolyte membrane and each of said first and second separators, said seal structure comprising:
   a first seal surface formed in said first separator, and a second seal surface formed in said second separator, said first seal surface and said second seal surface opposing each other; and
   a sealant collecting structure configured and disposed for collecting a portion of said sealant therein;
   wherein said first and second separators have sizes different from each other, and said sealant collecting structure includes a space formed outside a side surface of the smaller-sized separator.

3. A seal structure of a fuel cell where an outer periphery of an electrolyte membrane is encased by a sealant and held between a first separator and a second separator located on opposite sides of the electrolyte membrane so that said fuel cell is sealed between said first and second separators and between said electrolyte membrane and each of said first and second separators, said seal structure comprising:
   a first seal surface formed in said first separator, and a second seal surface formed in said second separator, said first seal surface and said second seal surface opposing each other; and a sealant collecting structure for collecting a portion of said sealant therein;
   wherein at least one of said first and second separators includes a chamfer formed at a corner of an outer end of said at least one of said first and second separators, said chamfer is formed such that a distance between said first and second separators is increased in a direction toward the outer end of said at least one of said first and second separators, and said sealant collecting structure includes said chamfer.

\* \* \* \* \*